June 12, 1934.  H. F. H. FAHNOE ET AL  1,962,342
ARC WELDING APPARATUS
Filed Jan. 17, 1931
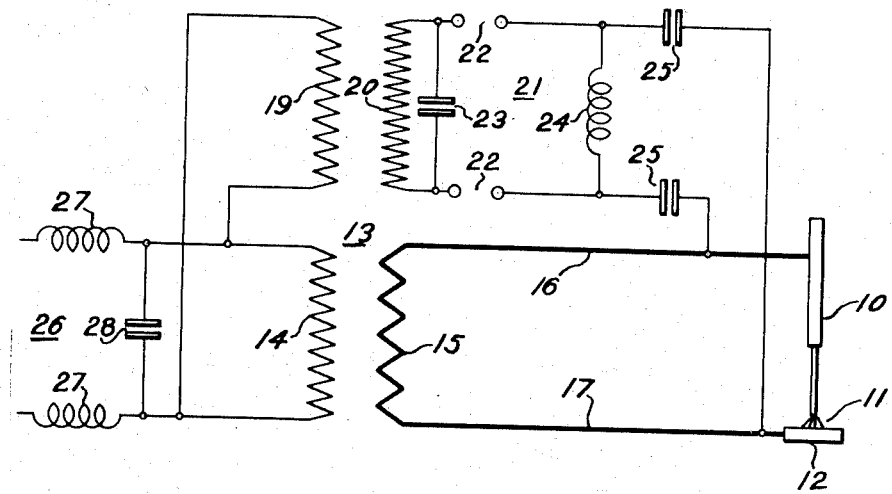
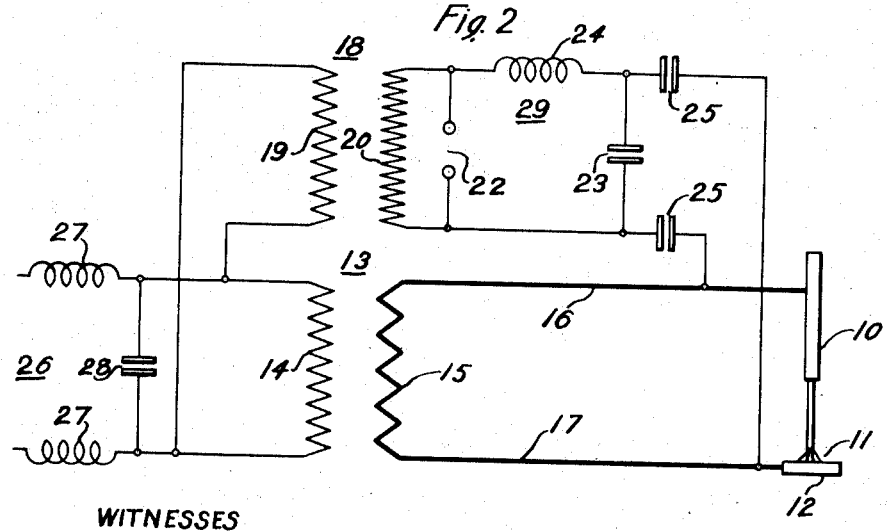
WITNESSES
Arthur J. McMahon
Robert R Lockwood
INVENTORS
Hans F. H. Fahnoe, Ervyl M. Glenn,
& Dewey D. Knowles
BY
Wesley S. Carr
ATTORNEY Patented June 12, 1934

1,962,342

UNITED STATES PATENT OFFICE 1,962,342

ARC WELDING APPARATUS

Hans Frederik Helwig Fahnoe and Ervyl Malvern Glenn, Sharon, and Dewey D. Knowles, Wilkinsburg, Pa., assignors to Westinghouse Electric and Manufacturing Company, a corporation of Pennsylvania Application January 17, 1931, Serial No. 509,308

13 Claims. (Cl. 219—8)

Our invention relates to arc welding apparatus and it has particular relation to arc welding apparatus in which an arc-stabilizing circuit is employed.

An object of our invention is to provide for striking an arc between a welding electrode and the work on which a welding operation is to be performed before the welding electrode touches the work.

The principal object of our invention is to provide for maintaining an arc between a welding electrode and the work on which a welding operation is to be performed during periods of tendency to arc disruption.

Another object of our invention is to confine the high-frequency oscillations applied to the arc within the arc welding apparatus.

Other objects of our invention will become evident from the following detailed description, taken in conjunction with the accompanying drawing, in which:

Figure 1 is a diagram of an alternating-current arc welding system organized in accordance with our invention and Fig. 2 is a diagram of a modification of the system shown in Fig. 1.

Referring to the drawing, the system shown in Fig. 1 comprises a welding electrode 10 disposed to ensure striking an arc 11 between it and the work 12 on which a welding operation is to be performed.

A main transformer, shown generally at 13, is to be connected to a source of low-frequency alternating current and has a primary winding 14 and a secondary winding 15. The secondary winding 15 is connected, by conductors 16 and 17, to supply welding current to the welding electrode 10 and the work 12.

An auxiliary transformer, shown generally at 18, has its primary winding 19 connected, in parallel circuit relation, to the primary winding 14 of the main transformer. A secondary high-voltage winding 20 is so located on the auxiliary transformer 18 as to energize the high-frequency oscillating circuit shown generally at 21.

The high-frequency oscillating circuit 21 comprises spark gaps 22, condenser 23 and inductance coil 24 connected in series-circuit relation and is connected to the high-voltage secondary winding 20 of the auxiliary transformer, as shown. The inductance coil 24 is connected between the welding electrode 10 and the work 12 through condensers 25.

In order to confine the high-frequency oscillations to the welding apparatus, a filter, shown generally at 26, is connected between the primary winding 14 of the main transformer 13 and a source of alternating current. The filter circuit 26 comprises inductance coils 27 connected in series-circuit relation to the primary winding 14 of the main transformer 13 and the condenser 28 connected across the winding, as shown.

The system shown in Fig. 2 is substantially the same as that shown in Fig. 1. The high-frequency oscillating circuit, shown generally at 29, is different, however. This circuit comprises a single spark gap 22, a condenser 23 and an inductance coil 24 connected in series-circuit relation and to the high-voltage winding 20 of the auxiliary transformer 18, as shown. The condenser 23 is connected between the welding electrode 10 and the work 12 through the condenser 25.

The operation of the above-described apparatus is as follows:

A low-frequency alternating current, such as a sixty-cycle current, is applied to the primary winding 14 of the main transformer 13 and to the primary winding 19 of the auxiliary transformer 18. The secondary winding 15 of the main transformer 13 is energized, and a welding potential is applied between the welding electrode 10 and the work 12 through conductors 16 and 17. The welding electrode 10 is placed at such distance from the work 12 that no welding current is permitted to flow.

The high-voltage secondary winding 20 of the auxiliary transformer 18 is energized at the same time and it, in turn, causes high-frequency oscillations to be produced in the high-frequency oscillating circuit 21.

When the high voltage is applied to the high-frequency circuit 21, the condenser 23 is charged. The spark gaps 22 are so adjusted that they will break down before the peak of the alternating-current-voltage wave is reached. A conducting path, through which the condenser 23 discharges, is formed through the conducting spark gaps 22 and the inductance coil 24, and high-frequency oscillations are produced. Because of the high impedance of the high-voltage winding 20, the high-frequency oscillations do not pass therethrough. The condenser 23 continues to discharge until the spark gaps 22 cease to break down. On the re-occurrence of the above condition, the condenser 23 again is charged and is discharged as explained above. Since the auxiliary transformer 18 is supplied from a source of constant frequency, the high-frequency oscillations in the circuit 21 will be maintained substantially constant.

Because of the high-frequency oscillations through the inductance coil 24, a relatively high voltage is produced across it. The high voltage from the inductance coil 24 is transferred to the welding circuit and between the welding electrode 10 and the work 12 by means of the condensers 25.

It will be readily understood that the welding electrode 10 may be grasped by an operator to perform a welding operation without any harmful effects to him. This is due to the fact that the high voltage impressed between the welding electrode 10 and the work 12 is a high-frequency voltage.

The welding electrode 10 is brought so close to the work 12 that the high-frequency high voltage impressed therebetween can start the arc 11. An ionized path is formed by the high-frequency current, and the main welding current from the secondary winding 15 of the main transformer flows to perform the welding operation.

It will be readily seen that there is no tendency for the electrode 10 to stick to the work 12 when the arc 11 is drawn. It is not necessary, when the high frequency current is applied to the welding electrode and the work 12, to touch them together to strike the arc.

Because of the periodic nature of the alternating current, the arc 11 tends to be disrupted when relatively low values of welding current are used. This disruption of the arc is caused by a lack of a sufficiently conducting path between the welding electrode 10 and the work 12 on reversal of the alternating current. It is then necessary to restrike the arc by touching the welding electrode 10 to the work 12. This operation increases the time for performing welding operations and often makes an imperfect weld.

When the high-frequency high-voltage oscillations are impressed across the welding electrode 10 and the work 12, an ionized path between them is continually formed, and the arc 11 is not readily disrupted.

It is desirable to so confine the high-frequency oscillations to the welding apparatus that they will not interfere with other apparatus that may be connected to the same current source. The inductance coils 27 of the filter circuit 26 tend to build up a high-frequency voltage across the primary winding 14 of the main transformer. The condenser 28 short circuits this potential and thereby prevents the high-frequency oscillations from leaving the circuit.

The operation of the system shown in Fig. 2 is substantially the same as that described for Fig. 1. The high-frequency high-voltage for stabilizing the operation of the arc 11 is taken from across the condenser 23 rather than from across inductance 24. It will be readily appreciated, by one skilled in the art, that the effect, in either case, will be the same.

The use of a high-frequency oscillating circuit for stabilizing the operation of an arc is not limited to use with an alternating-current welding arc. Direct current may be used for supplying the welding arc. The advantage of being able to strike an arc without touching the welding electrode to the work will be obtained. In addition, the arc will be more readily rekindled when, for some cause, it has been disrupted.

Although we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. The combination with a source of electric power for supplying welding current to a welding arc, and a transformer having a high-voltage winding, of a circuit disposed to produce high-frequency oscillations and disposed to be energized from the high-voltage winding of the transformer, said circuit comprising an inductance coil, a condenser and a plurality of spark gaps connected in series-circuit relation, and a plurality of condensers connected in series-circuit relation to the inductance coil and across the welding arc for superimposing the high-frequency oscillations on the welding current to stabilize the operation of said welding arc.

2. The combination with a source of electric power for supplying welding current to a welding arc, and a transformer having a high-voltage winding, of a circuit disposed to produce high-frequency oscillations and disposed to be energized from the high-voltage winding of the transformer, said circuit comprising an inductance coil, a condenser and a spark gap connected in series-circuit relation, and a plurality of condensers connected in series-circuit relation to the aforesaid condenser and across the welding arc for superimposing the high-frequency oscillations on the welding current to stabilize the operation of said welding arc.

3. The combination with a source of electric power for supplying welding current to a welding arc, and a transformer having a high-voltage winding, of a circuit disposed to produce high-frequency oscillations and disposed to be energized from the high-voltage winding of the transformer, and means, comprising a plurality of condensers, for superimposing high-frequency oscillations on the welding current to stabilize the operation of the welding arc, and means connected between the source of electric power and the welding arc to prevent the high-frequency oscillations from entering the source of electric power.

4. The combination with a source of electric power for supplying welding current to a welding arc, and a transformer having a high-voltage winding, of a circuit disposed to produce high-frequency oscillations and to be energized from the high-voltage winding of the transformer, said circuit comprising an inductance coil, a condenser and a plurality of spark gaps connected in series-circuit relation, a plurality of condensers connected in series-circuit relation to the inductance coil and across the welding arc for superimposing high-frequency oscillations on the welding current to stabilize the operation of said welding arc, and a plurality of inductance coils and a condenser in series-circuit relation and connected between the source of electric power and the welding arc to prevent the high-frequency oscillations from entering the source of electric power.

5. An arc welding apparatus comprising, in combination, a main transformer having a primary winding connected to a source of low-frequency current and a secondary winding for supplying current to a welding arc, an auxiliary transformer, a primary winding on the auxiliary transformer connected to the same current source as that to which the primary winding of the main transformer is connected, a high-voltage secondary winding on the auxiliary transformer, a circuit disposed to produce high-frequency oscillations and to be energized from said high-voltage secondary winding, said circuit comprising an inductance coil, a condenser and a plurality of spark gaps connected in series-circuit relation, a plurality of condensers connected in series-circuit relation to the inductance coil and across the welding arc for superimposing high-frequency oscillations on the current from the secondary winding of the main transformer to stabilize the operation of the welding arc, and a filter circuit for preventing the high-frequency oscillations from entering the source of low-frequency current, said filter circuit comprising a plurality of inductance coils connected in series-circuit relation to the primary winding of the main transformer and a condenser connected across said primary winding.

6. An arc welding apparatus comprising, in combination, a main transformer having a primary winding connected to a source of low-frequency current and a secondary winding for supplying current to a welding arc, an auxiliary transformer, a primary winding on the auxiliary transformer connected to the same current source as that to which the primary winding of the main transformer is connected, a high-voltage secondary winding on the auxiliary transformer, a circuit disposed to produce high-frequency oscillations and to be energized from said high-voltage secondary winding, said circuit comprising an inductance coil, a condenser and a spark gap connected in series-circuit relation, a plurality of condensers connected in series-circuit relation to the aforesaid condenser and across the welding arc for superimposing the high-frequency oscillations on the current from the secondary winding of the main transformer to stabilize the operation of the welding arc, and a filter circuit for preventing the high-frequency oscillations from entering the source of low-frequency current, said filter circuit comprising a plurality of inductance coils connected in series-circuit relation to the primary winding of the main transformer and a condenser connected across said primary winding.

7. Arc welding apparatus comprising, in combination, a welding circuit for supplying welding current to a welding arc to perform a welding operation, a high-frequency generator connected to a power source and to the welding circuit for superimposing high-frequency oscillations thereon to stabilize the operation of the welding arc, and inductive means connected between the high-frequency generator and the power source to prevent the high-frequency oscillations from entering the power source.

8. Arc welding apparatus comprising, in combination, a welding circuit for supplying welding current to a welding arc to perform a welding operation, a transformer provided with a primary winding for connection to a source of low-frequency current and a secondary winding, and a high-frequency generator connected to the secondary winding of the transformer and to the welding circuit for superimposing high-frequency oscillations thereon to stabilize the operation of the welding arc, said generator characterized by the provision of a plurality of spark gaps whereby the secondary winding of the transformer is short-circuited or open-circuited to prevent the application of the low-frequency current from the secondary winding to the welding circuit.

9. Arc welding apparatus comprising, in combination, a welding circuit for supplying welding current to a welding arc to perform a welding operation, a transformer provided with a primary winding for connection to a source of low-frequency current and a secondary winding, a high-frequency generator connected to the secondary winding of the transformer and to the welding circuit for superimposing high-frequency oscillations thereon to stabilize the operation of the welding arc, said generator characterized by the provision of a plurality of spark gaps whereby the secondary winding of the transformer is short-circuited or open-circuited to prevent the application of the low-frequency current from the secondary winding to the welding circuit and inductive means connected between the primary winding of the transformer and the source of low-frequency current to prevent the high-frequency oscillations from entering the power source.

10. Arc welding apparatus comprising, in combination, a welding circuit for supplying welding current to a welding arc to perform a welding operation, a transformer provided with a primary winding for connection to a power source and a secondary winding, a high-frequency generator connected to the secondary winding of the transformer for generating high-frequency oscillations, said generator including capacitive reactance means, and additional capacitive reactance means connected across said first-named capacitive reactance means and to the welding circuit for superimposing the high-frequency oscillations from the generator on the welding circuit to stabilize the operation of the welding arc.

11. Arc welding apparatus comprising, in combination, a welding circuit for supplying welding current to a welding arc to perform a welding operation, a transformer provided with a primary winding for connection to a power source and a secondary winding, a high-frequency generator connected to the secondary winding of the transformer for generating high-frequency oscillations, said generator including capacitive reactance means, additional capacitive reactance means connected to said first-named capacitive reactance means and to the welding circuit for superimposing the high-frequency oscillations from the generator on the welding circuit to stabilize the operation of the welding arc and inductive means connected between the primary winding of the transformer and the source of low-frequency current to prevent the high-frequency oscillations from entering the power source.

12. Arc welding apparatus comprising, in combination, a welding circuit for supplying welding current to a welding arc to perform a welding operation, a high-frequency generator connected to a power source and to the welding circuit for superimposing high-frequency oscillations thereon to stabilize the operation of the welding arc, and reactive means connected between the high-frequency generator and the power source to prevent the high-frequency oscillations from entering the power source.

13. The combination with a source of electric power for supplying welding current to a welding arc and a transformer having a high voltage winding, of a circuit disposed to produce high-frequency oscillations and disposed to be energized from the high-voltage winding of the transformer, said circuit comprising an inductance coil, a condenser and at least one spark gap connected in series circuit relation, and a plurality of condensers connected in series-circuit relation to the inductance coil and across the welding arc for superimposing the high-frequency oscillations on the welding current to stabilize the operation of said welding arc.

HANS FREDERIK HELWIG FAHNOE.
ERVYL MALVERN GLENN.
DEWEY D. KNOWLES.